April 14, 1970  R. KOMPFNER  3,506,331
OPTICAL WAVEGUIDE
Filed Oct. 3, 1967  2 Sheets-Sheet 1

INVENTOR
R. KOMPFNER
BY
ATTORNEY

April 14, 1970  R. KOMPFNER  3,506,331
OPTICAL WAVEGUIDE

Filed Oct. 3, 1967  2 Sheets-Sheet 2

United States Patent Office 3,506,331
Patented Apr. 14, 1970

3,506,331
OPTICAL WAVEGUIDE
Rudolf Kompfner, Middletown, N.J., assignor to Bell Telephone Laboratories, Incorporated, Murray Hill, N.J., a corporation of New York
Filed Oct. 3, 1967, Ser. No. 672,535
3,506,331
U.S. Cl. 350—45                                    4 Claims

ABSTRACT OF THE DISCLOSURE

Optical frequency wave propagation apparatus in which an inner guide containing energy focusing means is mounted within an outer guide having a mechnaical linkage which displaces the inner guide toward the center of curvature of deformations of the outer guide.

Compensation of supporting guide deformations permits the guided optical beam to remain on the outer guide axis.

BACKGROUND OF THE INVENTION

Field of the invention

This invention relates to optical communications and, more particularly, to apparatus for guiding beams of optical frequency electromagnetic wave energy over long distances with low loss.

Description of the prior art

Enclosed conductive pipe has been previously suggested as a transmission means for microwave frequency wave energy over long distances. See, for example, the article entitled "Waveguide as a Communication Medium" by S. E. Miller which was published in volume 33, No. 6, of the Bell System Technical Journal, November 1954, for a discussion of the proposed system and the attendant problems. The advent of the laser during the past decade has now stimulated activity in the area of long-distance communication media for the optical frequency range. As in the microwave frequency region, enclosed conductive tubes, commonly called "light pipes," have been proposed for use at optical frequencies as the transmission medium. The purpose of the surrounding pipe is more to shield the propagating energy from atmospheric influences, such as precipitation, dust, air turbulence, fog, and the like, than to confine and to guide the energy. Typically, energy focusing means are positioned within the surrounding pipe, and serve to guide and direct the energy free from interrelation with the pipe itself.

A simple problem associated with such long pipes arises from the curvature of the earth. Since electromagnetic waves propagate in a straight line, focusing and redirecting means, such as mirrors, lenses, or prisms, are routinely needed to change the energy propagation direction.

A more serious problem arises from abrupt direction changes. Guide bends necessary to follow rights-of-way or to compensate for rough terrain can be planned in advance, and by using various arrangements of the above-named redirecting means, the problem can be solved. However, misalignments caused by earth settling or heaving, lateral faulting, and other disturbances of portions of the terrain upon which the line is supported are not predictable. Such shifts in terrain can cause the conductive pipe to bend out of shape, even to deform beyond its elastic limit. The result is that the wave energy propagating within the guide is deflected from the center of the guide and strikes the conductive wall, thus imparting undesirable losses and reflections to the propagating wave.

To reduce the effect of deformations in a microwave frequency communication system, F. T. Geyling proposes in United States Patent 3,007,122, issued Oct. 31, 1961, that the transmission guide be linked via vertical and horizontal fluid suspension means to a surrounding pipe. The individual engaging means of the fluid suspensions of each system are interlinked such that pressure at one engaging means caused by deformation of the outer guide introduces a translation of the inner guide within the outer guide to compensate for the deformation without disturbing the propagation within the inner guide. Such an arrangement is difficult to assemble and maintain since the fluid suspension system is interconnected among perhaps hundreds of engaging points. In addition, optical transmission tolerances are considerably more critical than those at microwave frequencies and thus many more suspension engagement points would be required at the higher frequencies.

SUMMARY OF THE INVENTION

In accordance with the principles of the present invention, a dual pipe, optical frequency, waveguiding arrangement automatically maintains the optical beam near the axis of the outer pipe even in the presence of outer pipe deformations. Lens-containing inner pipe sections are mounted within the outer pipe by mechanical means which act to displace the inner pipe sections toward the center of curvature of any deformation.

According to one principal embodiment, guiding lenses are supported by an inner pipe of sufficient flexibility which is itself supported by a plurality of diaphragms. The diaphragms contain a number of holes spaced around their circumference, which guide pairs of ball bearings which, in turn, contact conical bearings making a close fit inside the outer pipe.

According to a second principal embodiment, guiding lenses are supported within short inner pipe sections which are themselves interconnected by longitudinal tensioning means and which are connected to the outer pipe by radial tensioning means. Due to the axial tension, the inner pipe sections are pulled toward the center of curvature of any outer pipe deformation by an amount dependent on the radius of curvature. The geometry, strength, and tension of the tensioning means provide a displacement which equals the product of the focal length of the lenses times the length therebetween, divided by the radius of curvature of the deformation.

BRIEF DESCRIPTION OF THE DRAWING

A more complete understanding of the principles of the invention, together with its mode of operation and its various advantages, can be obtained by reference to the accompanying drawing and to the detailed description thereof which follows. In the drawing.

DETAILED DESCRIPTION

Figure 1:
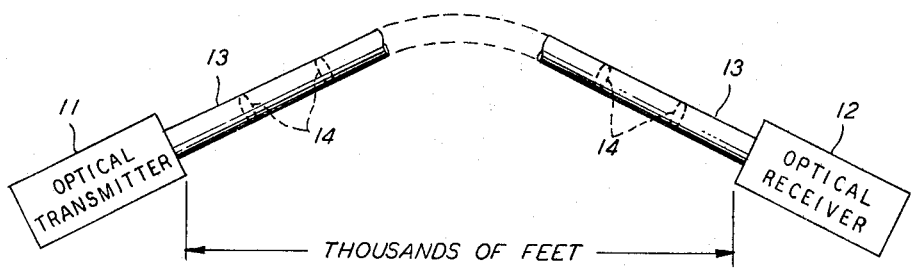
FIG. 1 is a representational view of a long-distance optical frequency transmission system.

In more detail, the diagrammatic embodiment of FIG. 1 shows a long-distance optical communication system. The system is characterized as long to distinguish it from the short distances found in terminal equipment and to indicate an application of lens-containing light pipe in a long-distance communication system. The length of such a system would be measured in terms of thousands of feet and perhaps miles as opposed to several inches or a few feet in terminal equipment. The system comprises a first terminal station 11 which can be an optical transmitter, or a repeater if this is an intermediate station, which is to be connected to an optical receiver or subsequent repeater comprising terminal station 12. Interconnecting terminal stations 11 and 12 is an optical transmission medium 13 to be set out in greater detail subsequently.

Transmission medium 13 is illustrated schematically as comprising a conductively-bounded hollow cylindrical pipe containing a plurality of coaxially-spaced lenses 14. A pipe for transmitting optical wave energy often has been called a light pipe. When lenses are included within the light pipe, the term "lens pipe" is appropriate. Thus, transmission medium 13 comprises a lens pipe.

Due to the practical considerations mentioned earlier, medium 13 is not rectilinear along its entire length. Since it is known that when a pipe containing a sequence of coaxial lenses is bent, a beam of light traversing it can wander from the axis, encounter a limiting aperture, and be lost from the system, it is necessary that means be provided in any long-distance optical transmission arrangement to ensure that the beam remains near the guide axis. This result is to be ensured for deformation of the pipe into a radius of curvature R in any plane containing the axis. This can be achieved by displacing the lenses by an amount $\Delta R$ toward the center of curvature of the bend according to the relation $$\Delta R = fl/R \quad (1)$$

where $f$ is the focal length of the lenses and $l$ is the distance between them.

Figure 2:
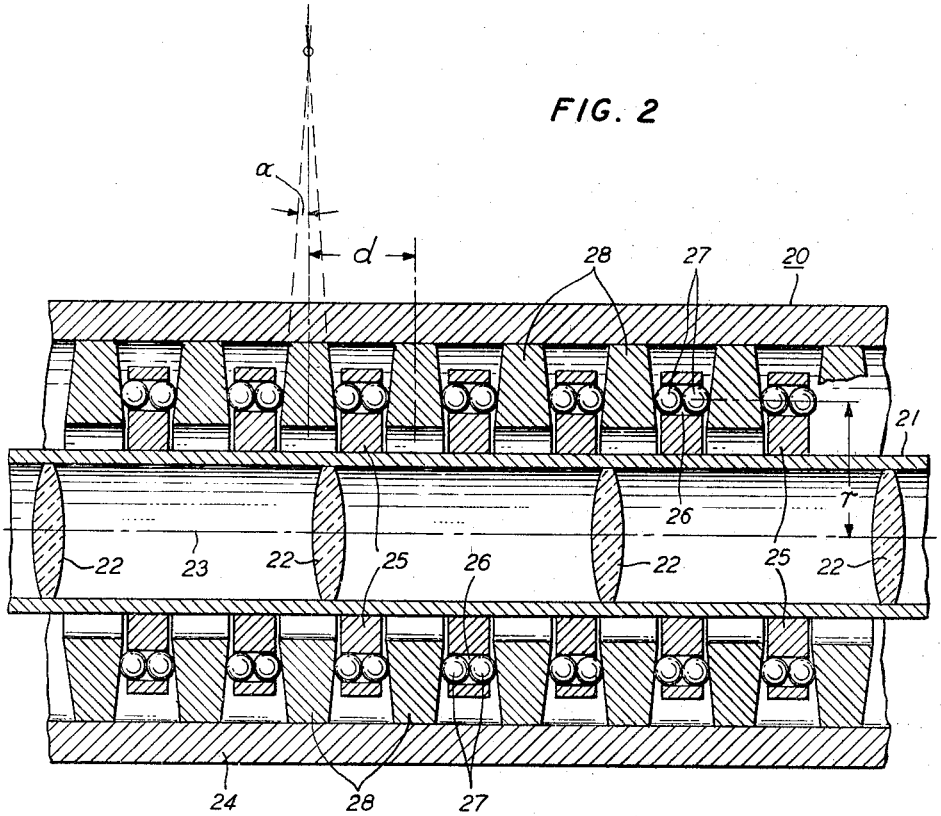
FIG. 2 is a cross-sectional view of a first principal embodiment of the principles of the invention.

One principal embodiment of such an optical guide is illustrated in FIG. 2 which shows in a detailed cross-sectional view a short section of guide 20. Interior to guide 20 is an inner circularly symmetric hollow pipe 21 which supports a plurality of lenses 22 in spaced relation along the axis 23 of pipe 21. Each of lenses 22 is of optical quality and has a focal length $f$ equal, in the instant description, to the lens separation $l$. Thus, the focal point of each successive lens falls at the midpoint of its adjacent neighbor. Inner pipe 21 is of sufficient flexibility to permit normal stresses and strains without fracture and of sufficient mechanical accuracy to maintain rectilinear transmission where desired. Typically, the pipe does not participate in the propagation to a great extent. However, the propagating fields would have a low intensity at the inner surface of pipe 21, and it is, therefore, advantageous that it be made as black as possible to avoid unwanted signal radiation. For a more complete discussion of lens-guided optical communication see the article entitled "Modes in Sequences of Lenses" by J. R. Pierce which appeared in the Proceedings of the National Academy of Sciences, volume 47, No. 11, pages 1808–1813, November 1961.

Surrounding pipe 21, and mechanically interlinked therewith, is outer pipe 24, which has a stiffness considerably greater than that of inner pipe 21. Also surrounding pipe 21, and having a close fit thereto with an outer radius less than the radius of pipe 24, are a plurality of spaced annular diaphragms 25 which are the direct support for the inner pipe. Each of diaphragms 25 contains a plurality of evenly spaced holes 26 therein at a radius $r$ from axis 23, two of which are shown in the cross-sectional view of FIG. 2. Within each hole 26 in diaphragms 25 are pairs of balls 27 having a diameter greater than half the thickness of the diaphragms. Balls 27 are smooth finish ball bearings, and they extend beyond the diaphragm aperture in which they are placed to engage conical bearing members 28. The conical bearing members, which have a separation $d$ center to center, are affixed to outer pipe 24 and have a cone half angle $\alpha$ to be more fully described hereinafter.

When the guide of FIG. 2 is installed along the desired right of way, the normal configuration will be one in which the central axis is rectilinear. When, however, deformations occur, either intentional or unexpected due to heaving or settling of the surrounding medium, the mechanical linkage between inner pipe 21 and outer pipe 24 compensates for the shift in order to keep the optical energy within the inner pipe on the axis 23. For example, if the outer pipe in FIG. 2 is pushed upward at its center so that the portion below axis 23 is concave and the part above axis 23 is convex, conical bearings 25 will be squeezed closer together below the axis and spread further apart above the axis. The net effect of these opposite movements is to create forces in directions opposite those producing the deformation. These forces cause the ball bearings 27 to roll, thus repositioning the lens-containing inner pipe 21. In the present example, the upward deforming force causes the inner pipe to move downward, thus compensating for and eliminating the unwanted displacement of the transmission medium.

As stated hereinbefore, the condition for compensation of an introduced curvature of radius R is an amount $\Delta R = fl/R$, where $f$ and $l$ are the focal length and separation of the lenses 22, respectively. For the embodiment of FIG. 2, it can be shown that this requires, in terms of the parameters of the system, that $$\frac{rd}{2}(\cotan \alpha + \tan \alpha) = fl \quad (2)$$

For the coaxial lens system, a typical set of parameters are $f=l=30$ centimeters; $r=3$ centimeters, and $d=3$ centimeters. Such an arrangement requires $\alpha$ to be one-quarter of a degree of arc.

Figure 3:
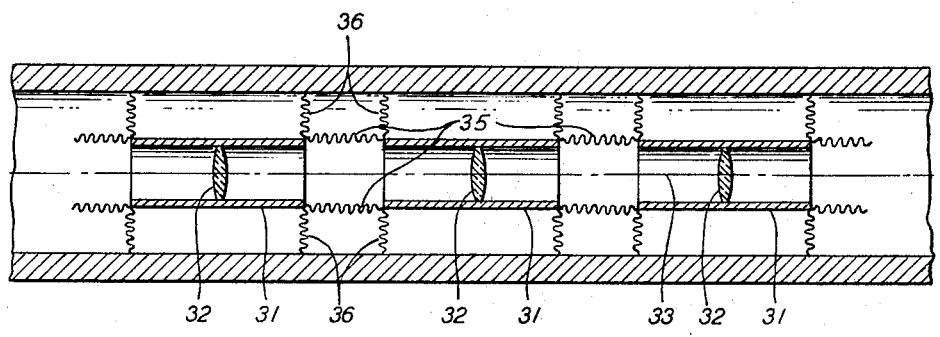
FIG. 3 is a cross-sectional view of a second principal embodiment of the principles of the invention.

A second embodiment of the principles of the invention is shown in FIG. 3 in which a plurality of inner pipe sections 31 are supported both longitudinally and radially by resilient members such as, for example, springs. Each of pipe sections 31 contains a focusing lens 32, and the spacing $l$ between successive lenses is advantageously equal to twice their focal lengths $f$. Thus, the optical system is a confocal one, with an axis of propagation 33.

The resilient members interconnecting inner pipe section 31 with outer surrounding pipe 34 are, in more detail, longitudinally tensed members 35 and radially tensed members 36. Each adjacent pair of pipe sections 31 has a plurality of members 35 positioned about their ends and extending therebetween. At each point of connection of a longitudinally tensed member a radially extending tensed member 36 extends between that location and the outer pipe. Thus, the inner pipe sections are suspended within a "cage" of tension members. Each of the tension members has a coefficient of stiffness associated with it. When the stiffnesses are properly related, the displacement $\Delta R$ of the inner pipe sections in response to a deformation having a radius of curvature R of the outer pipe will be just sufficient to neutralize the potentially adverse effect of the outer guide displacement upon the wave propagation within the inner guide. More specifically, as will be shown subsequently, the structure of FIG. 3 can be made to exhibit behavior according to the expression $\Delta R \cdot R = f \cdot l$ for all values of R.

Figure 4:
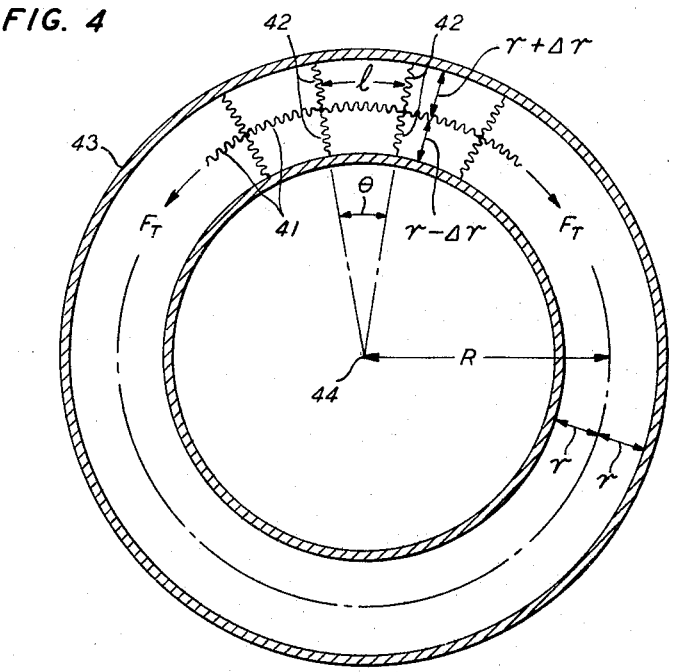
FIG. 4 is a schematic view helpful in understanding the embodiment of FIG. 3.

In order to simplify the analysis of the beam centering lens pipe of FIG. 3, consider the simplified arrangement of FIG. 4 in which a completely circular representation of the dual guide with resilient members of FIG. 3 is shown. Essentially, the inner pipe sections 31 and their associated longitudinal tensioning members 35 of FIG. 3 are combined in FIG. 4 into longitudinal members 41 to which a tensioning force $F_T$ is applied. Similarly, the radial tensioning members 36 from each pipe section 31 in FIG. 3 are combined into a single radial member 42 in FIG. 4 extending between one wall of outer pipe 43 and the central axis, which is defined as being a distance $r$ from either wall of guide 43 when no deformations are present. The radial members 42 are assumed to be unstrained in the initial condition, and an angle $\theta$ is defined at the center of curvature 44 between adjacent radii which extend to the members 42.

The force $F_T$ which was initially applied axially becomes, in the circular idealized embodiment, a tangential force. The geometry then can be examined as follows:

$$\sin \theta/2 = \frac{l/2}{R} = \frac{l}{2R} \qquad (3)$$

Since the actual angles involved are quite small, $\sin x = x$ and Equation 3 becomes $$\theta = l/R \qquad (4)$$

The vector forces acting about the central node are $$\sin \theta/2 = \frac{F_R/2}{F_T} \qquad (5)$$

or $$\sin \theta = \theta = \frac{F_R}{F_T} \qquad (5)$$

where $F_R$ is the radial force caused by the deformation. From Equations 4 and 5

$$\frac{F_R}{F_T} = \frac{l}{R} \qquad (6)$$

From classical spring theory, where K's are the effective spring constants or stiffnesses, $$\Delta l = K_1 l F_T$$
$$\Delta r = \frac{1}{2} K_2 r F_r \qquad (7)$$

where $\Delta l$ is the initial extension of the axial springs. Substituting between Equations 6 and 7, $$\Delta r R = \frac{1}{2} \frac{K_2}{K_1} \Delta l r \qquad (8)$$

Since $K_2$, $K_1$, and $r$ are constants of the structure and $\Delta l$ is produced by appropriate prestressing, the product $\Delta r R$ is a constant. In accordance with the inventive principles, $\Delta r R$ is made equal to $fl$, the product of focal length and lens separation in order to compensate for unwanted deformation of the transmission line. Thus, the lenses will be displaced toward the center of curvature of any introduced deformation by just the amount to effect compensation.

In all cases it is understood that the above-described embodiments are illustrative of the principles of the invention. Numerous and varied other arrangements can be devised by those skilled in the art without departing from the spirit and scope of the present invention.

I claim:

1. Means for guiding optical wave energy along a desired path comprising:
    an inner light pipe housing optical lenses spaced along an axis conforming essentially to the desired path,
    an outer pipe surrounding the inner pipe whose axis desirably conforms essentially to the desired path but is subject to deformation,
    and means for supporting said inner pipe within said outer pipe and for repositioning said inner pipe in response to deformation of said outer pipe to maintain the propagation of light within said inner pipe essentially along the desired path,
    said means including a plurality of spaced annular diaphragms affixed to the light pipe, each diaphragm including a plurality of holes spaced about its circumference and supporting within each hole a pair of ball bearings which in turn contact conical bearings making a close fit inside the outer pipe.

2. The optical guiding means of claim 1 in which the optical lenses in the inner pipe have a focal length $f$ and a separation $l$, the centers of the ball bearings are spaced a distance $r$ from the axis conforming to the desired path, and the conical bearings have a conical half angle $\alpha$ and a center-to-center spacing $d$ along the axis conforming to the desired path where $$fl = \frac{rd}{2}(\cotan \alpha + \tan \alpha)$$

3. Means for guiding optical wave energy along a desired path comprising:
    an inner light pipe housing optical lenses spaced along an axis conforming essentially to the desired path,
    and an outer pipe surrounding the inner pipe whose axis also conforms essentially to the desired path but is subject to deformation,
    the inner pipe comprising a plurality of sections, successive sections connected end to end by way of longitudinal tensioning means and individual sections connected to the outer pipe by radial tensioning means,
    the longitudinal tensioning means and the radial tensioning means providing a displacement of the inner pipe sections which compensates for deformations in the outer pipe whereby the direction of wave propagation continues to conform generally to the desired path.

4. The optical guiding means according to claim 3 wherein the product of the radius of curvature R of said outer pipe and the resulting transverse displacement $\Delta r$ of said inner pipe is equal to a constant given by $$\frac{1}{2} \frac{K_2}{K_1} \Delta l r$$

where:

$K_1$ is the coefficient of stiffness of said longitudinal tensioning means,
$K_2$ is the coefficient of stiffness of said radial tensioning means,
$r$ is the radius of said outer pipe, and
$\Delta l$ is the initial extension of said longitudinal tensioning means.

References Cited

UNITED STATES PATENTS

| | | | |
|---|---|---|---|
| 3,007,122 | 10/1961 | Geyling | 333—95 X |
| 3,382,022 | 5/1968 | Fox. | |
| 3,410,627 | 11/1968 | Berreman et al. | 350—54 |

PAUL R. GILLIAM, Primary Examiner

U.S. Cl. X.R.

350—95